United States Patent [19]

Schreiber

[11] 4,171,189
[45] Oct. 16, 1979

[54] LIFT-FORCE PUMP ACTIVATED BY THE WEIGHT AND BUOYANCY OF GIANT BUOYS

[76] Inventor: Gus Schreiber, 1430 Medical Arts Bldg., Dallas, Tex. 75201

[21] Appl. No.: 919,380

[22] Filed: Jun. 26, 1978

Related U.S. Application Data

[63] Continuation of Ser. No. 752,980, Dec. 21, 1976, abandoned, which is a continuation-in-part of Ser. No. 652,745, Jan. 27, 1976, abandoned.

[51] Int. Cl.² .............................................. F04B 17/00
[52] U.S. Cl. .................................... 417/332; 417/333; 60/506
[58] Field of Search ............... 417/332, 333, 330, 331; 60/496, 506, 398; 290/53, 42

[56] References Cited

U.S. PATENT DOCUMENTS

| 616,467 | 12/1898 | Jones | 60/398 |
|---|---|---|---|
| 1,244,309 | 10/1917 | Fox | 417/332 |
| 1,485,574 | 3/1924 | Vieta | 60/506 |
| 3,970,415 | 7/1976 | Widecrantz | 60/496 |

FOREIGN PATENT DOCUMENTS

460634 12/1950 Italy .......................................... 60/506

*Primary Examiner*—Carlton R. Croyle
*Assistant Examiner*—R. E. Gluck
*Attorney, Agent, or Firm*—Richards, Harris & Medlock

[57] ABSTRACT

An apparatus is provided for converting the motion of waves in a body of water to a usable form, including a support structure, a lever arm pivotally supported from the support structure, and a buoy fixed to one end of the lever arm and positioned on the body of water. A lift-force pump is attached to the lever arm and actuated by the movement of the lever arm of the body of water. The pump, the lever arm and the buoy are designed such that the buoy is substantially submerged in the body of water by ascending waves before a sufficient buoyance force is applied by the water to the buoy to drive the pump thereby making more efficient use of the buoyance force on the buoy.

1 Claim, 4 Drawing Figures

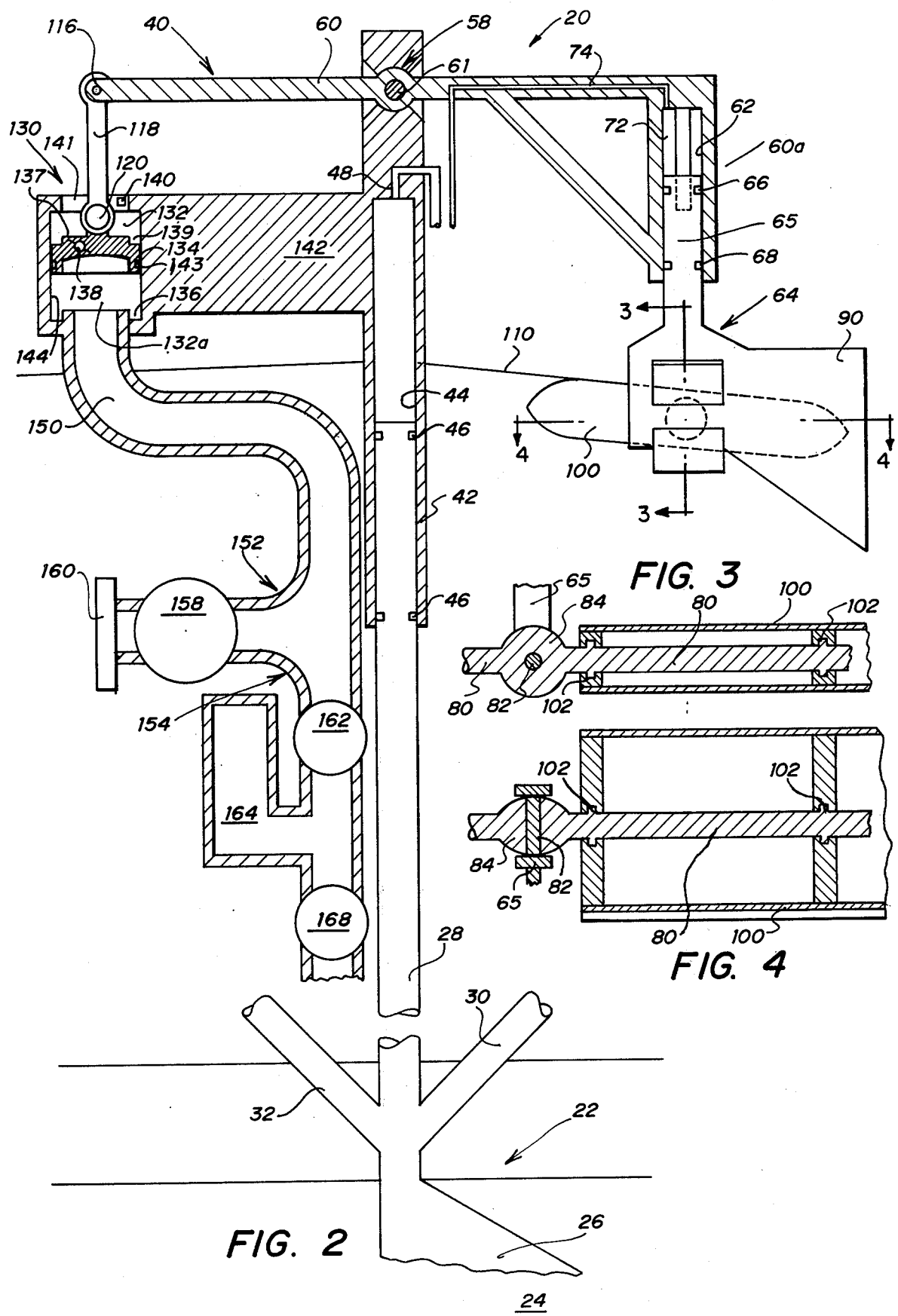

LIFT-FORCE PUMP ACTIVATED BY THE WEIGHT AND BUOYANCY OF GIANT BUOYS

CROSS REFERENCE TO RELATED APPLICATION

This is a continuation of application Ser. No. 752,980, filed Dec. 21, 1976, now abandoned, which is a continuation-in-part of Ser. No. 652,745, Jan. 27, 1976, abandoned.

BACKGROUND OF THE INVENTION

1. Field of the Invention

The present invention relates to an apparatus for converting wave motion to useable energy and more particularly to an apparatus for harnessing the energy of ascending waves to drive a lift-force pump.

2. Prior Art

Man has long sought to harness the energy of wave motion and to convert it to a useable energy form. Prior art systems for utilizing the energy of ocean waves to generate power have generally been of three types. The first uses a float which rises and falls with the motion of the ocean waves while converting this motion to useable energy. Examples of these apparatus are found in U.S. Pat. No. 616,467, to S. H. Jones and in U.S. Pat. No. 1,244,309, to W. C. Fox. Other prior art devices, exemplified by U.S. Pat. No. 3,928,967 to S. H. Salter, attempt to harness the energy of the incoming waves by providing structures which are rotated by the movement of the waves with the resulting rotation being converted into useable energy. Other syetems, exemplified by U.S. Pat. No. 1,766,457, to C. H. Ruth, provide systems for converting the energy embodied in the rising and falling of tides to drive a water pump.

These devices have failed to harness any significant proportion of the available energy of wave motion primarily because of their failure to properly apply basic physics tenets relating to the lifting forces provided by a buoyant object. Thus, while the prior art systems have tapped a small portion of the energy embodied in ocean wave motion, they have been only moderately successful because of their failure to extract the maximum energy available from wave motion.

SUMMARY OF THE INVENTION

In accordance with one embodiment of the invention, an apparatus is provided for converting the motion of waves in a body of water to a usable form, including a support structure, a lever arm pivotally supported from the support structure, and a buoy fixed to one end of the lever arm and positioned on the body of water. A force pump is attached to the lever arm and actuated by the movement of the lever arm of the body of water. The force pump, the lever arm and the buoy are designed such that the buoy is substantially submerged by ascending waves in the body of water before a sufficient buoyance force is applied by the water to the buoy to drive the pump thereby making more efficient use of the buoyance force on the buoy.

With this arrangement, the present invention overcomes the deficiencies of the prior art systems by recognizing and applying certain basic tenets of physics relating to the vertical lifting force supplied by an ascending body of water on an object submerged in the water. In accordance with Archimedes' Law, when a body is submerged in a fluid, the fluid exerts an upward force on the body equal to the weight of the fluid displaced by the body. As a floating object, such as a buoy, displaces water the object sinks until it displaces its weight in water. When additional downward force is added to the top of the object, it continues to sink until the upward force of its buoyance, measured by the weight of the water displaced, is equal to the downward force on the object. When this has occurred, the object is in equilibrium, and as the object displaces more water, the upward force defined by Archimedes' Law is increased proportionally to the volume of water displaced. Thus, the net upward force on the object is equal to the weight of the volume of water displaced minus the weight of the object.

If the upward force acting on a buoy as a result, is greater than the downward resistance exerted against it, the buoy will float at some depth of partial submersion. If the buoy is submerged but floating in an ascending wave, it will rise with the wave exerting an upward force through distance thereby performing work. By transferring this work to a force pump, the kinetic energy in ascending waves is harnessed.

The present invention makes the greatest possible utilization of these principles by designing a buoy in relation to the force pump which it drives. Knowing the force required to actuate the force pump, the buoyancy or size of the buoy and the structure connecting the buoy and pump are designed so that the buoy is substantially submerged though barely floating at the point when the upward buoyant force becomes sufficient to drive the force pump. Through such an arrangement, the maximum bouyancy potential of the bouy is employed to actuate the force pump thereby extracting maximum lift energy from an ascending wave in which the buoy rests.

In accordance with another embodiment of the invention, the pump driven by the system is a lift pump-force pump combination with the upper wall of the pump cylinder being 30 feet above mean sea level. In this arrangement, the force produced by the pull of gravity on the buoys, as they "float" down descending waves, is utilized to produce a negative pressure in the pump. This negative pressure is utilized when the waves are high enough to elevate the water to a height of 30 feet above sea level. This height is actually produced by the atmospheric pressure of 14.70 pounds per square inch provided the negative pressure produced by the weight of the buoys is 14.70 pounds per square inch. Full or partial use of this water lift is made thereby causing the pump to act as a "lift" pump when the buoys are moving downward with descending waves—and as a "force" pump when the buoys are partially submerged and climbing the ascending waves. Whatever elevation of water is obtainable in the "lift" pump, produces a similar elevation of water in the conduit system on shore before the "force" pump begins to act to push the water higher on shore. In other words, the pressure required of the lift-force pump to lift water to a specific height is reduced by 14.70 pounds per square inch—a considerable and significant contribution to the efficiency of the pumping system.

Pumps which are placed upon the surface of the sea are subjected to many hazards and the many variations of wave height and direction. The entire functioning unit of the present invention is supported at a desired height by a hydraulic system which permits the lowering of the entire unit below the surface of the ocean during hurricanes and their accompanying "storm surge" waves. This same system permits the altitude of the fulcrum of the buoy lever to be varied with the tides. It also permits the positioning of the fulcrum at an optimum altitude so that the lever is at such an angle which allows the filling of the lift pump to the highest possible altitude above mean ocean level on the downstroke of the buoy (this angle varying with the average height of waves present). This same hydraulic supporting system is constructed so that it rotates on its supporting base in response to wave action against a rudder-like projection on the buoy lever.

DESCRIPTION OF THE DRAWINGS

For a more complete understanding of the present inention, and for further details and advantages thereof, reference is now made to the following description taken in conjunction with the accompanying drawings in which:

FIG. 2 is a vertical section of the preferred embodiment illustrated in FIG. 1;

FIG. 3 is a section view taken along line 3—3 of FIG. 2; and

FIG. 4 is a section view taken along line 4—4 of FIG. 2.

DESCRIPTION OF THE PREFERRED EMBODIMENTS

Figure 1:
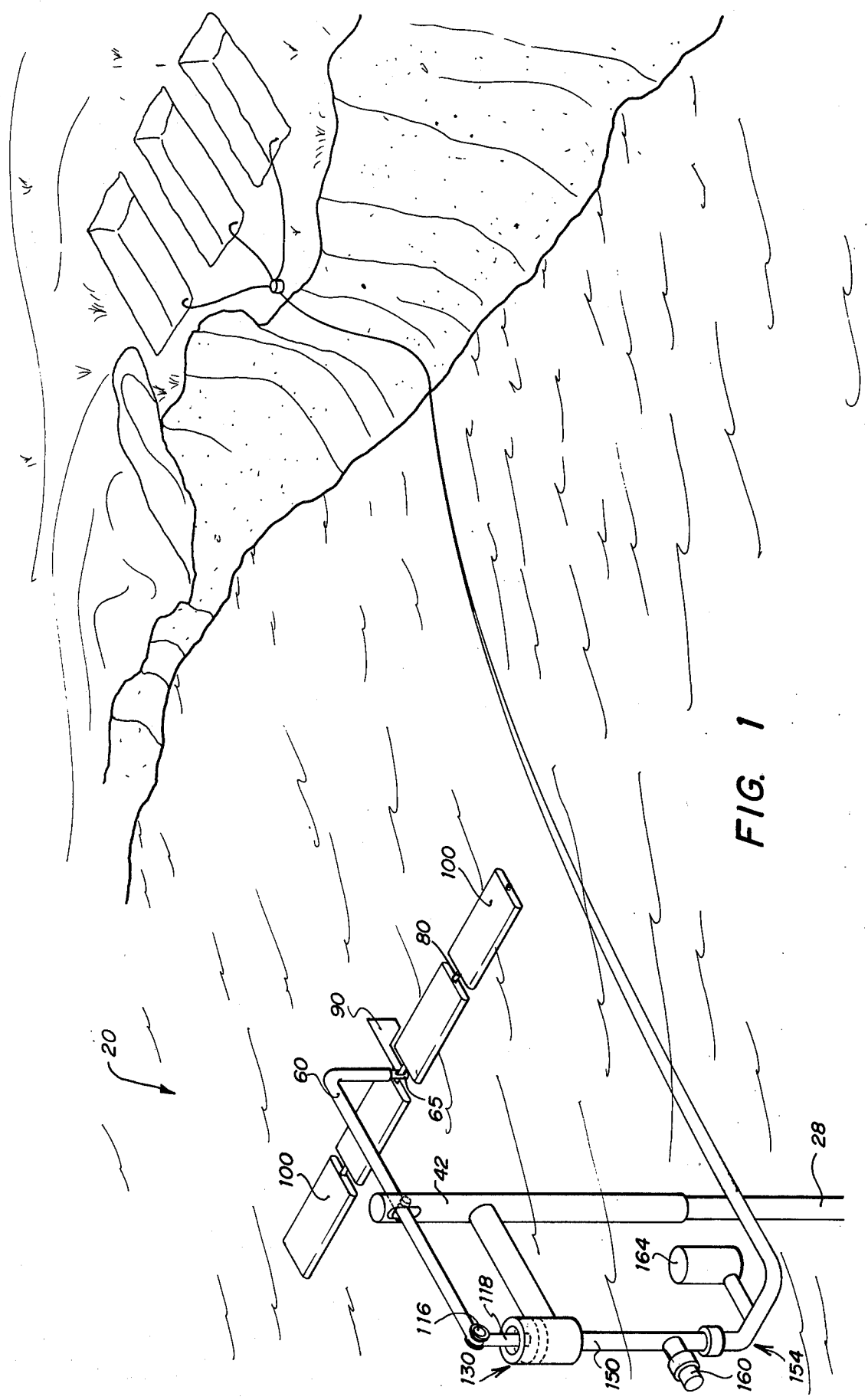
FIG. 1 is a perspective view of a system embodying the present invention.

FIGS. 1 and 2 illustrate a preferred embodiment of a system 20 embodying the present invention. System 20 includes a foundation structure 22 appropriately anchored to the ocean floor 24 by a foundation 26 and other suitable support and anchoring structures as is dictated by the particular location of the apparatus. Foundation 26 supports a pylon 28 which rises vertically from the foundation anchored in the ocean floor.

Other pylons 30 and 32 extend from foundation 26 to support functioning units similar to the one hereinafter described as supported by pylon 28. The functioning structure, identified generally by the numeral 40, includes a vertical support member 42 formed with a concentric longitudinal cavity 44 in the lower portion thereof such that the upper end of pylon 28 is received in and translates within cavity 44. Appropriate seals 46 are provided between the upper portion of pylon 28 and the inner wall forming cavity 44 to form a fluid type chamber within cavity 44. A passageway 48 is formed in support member 42 with one end opening into cavity 44 and the other end attached to a pressure source (not shown) capable of adding and withdrawing an appropriate fluid within cavity 44. As will hereinafter be discussed in greater detail, by adding hydraulic fluid under pressure through passageway 48, the functioning unit 40 may be raised and lowered such that rigid structure 42 telescopes upwardly or downwardly relative to pylon 28 to raise and lower the functioning unit as desired.

A lever arm 60 has a pivot pin 61 formed integral therewith which is received in joint 58 of support member 42. One end of arm 60 has a downward extending portion 60a formed therewith. A bore 62 is formed in the portion 60a, and a buoy support 64 is formed with an arm 65 receivable within bore 62. Arm 65 has a longitudinal rib 65a extending along the longitudinal length thereof. Rib 65a is received within a spline 65b formed in portion 60a of arm 60 to prevent rotation of arm 65 within bore 62. Bushings 66 and 68 provides a fluid tight seal between the inner wall of bore 62 and arm 65 and permits the telescoping of buoy support 64 vertically relative to lever 60. A chamber 72 is formed by the bore in arm 60 and arm 65. A passageway 74 communicates between chamber 72 and a fluid pressure source 76 (not shown) such that fluid may be introduced through passageway 74 into and out of chamber 72 to vertically telescope and retract buoy support 64 relative to lever 60.

Referring to FIGS. 1, 3 and 4, buoy support 64 includes a transverse arm 80 rotatably supported from arm 65 by a pin 82 extending through the bifurcated end of arm 65 and a hub 84 of arm 80. A fixed rudder 90 is attached from arm 65 and aligns the buoy and buoy support with the direction of wave movement. Arm 80 pivotally supports a plurality of relatively thin and large surface buoys 100. In one embodiment of the invention, buoys 100 are fluid tight containers formed with comparatively thin skins and highly buoyant within the water. Suitable bearing structures 102 (FIGS. 3 and 4) are provided within buoys 100 and encircle arm 80 to permit the rotation of buoys 100 about arm 80. This connection, however, prevents movement by buoys 100 along the longitudinal length of arm 80.

As can be seen in FIG. 2, buoys 100 generally track the surface of water surface 110. Lever 60 has its fulcrum point within rigid structure 42 at socket joint 58 which permits the rotation of lever 60 in a vertical plane through joint 58. Likewise the arm and sleeve arrangement between support member 42 and pylon 28 permits 360 degree rotation of lever 60 and functioning structure 40. Thus, buoys 100 are free to move both in horizontal planes and to rotate about arm 80.

The end of lever 60 remote from the end received within buoy support 64 is pivotally connected by a suitable pivot pin 116 to a vertical connecting rod 118. The end of linkage 118 remote from its connection to lever 60 is pivotally connected by suitable pivot joint 120 to to a force pump indicated generally by numeral 130.

Force pump 130 includes a cylinder chamber 132 and a piston 134 acting therein. Piston 134 is pivotally attached to rod 118 at pivot joint 120. Cylinder chamber 132 of the pump is provided with lower dashpot 136 to "cushion" an over descent of the piston. The lower surface of the piston has a concave shape. The highest portion of this concavity is provided with a small passageway 137 through the piston so that a low pressured pressure relief valve 138 will permit a limited flow of water, or air and water, out the top of the piston where the water will fill an upper dashpot 139 of the piston while simultaneously sealing the piston as a "primer" for the suction pump. A drainage port 140 is provided in the cylinder 132 allowing any excess of water to escape therefrom. A passageway 141 provides an open space about the connecting rod allowing both a free lateral movement of the rod and for the to and fro passage of air into the top of the cylinder of the pump. The pump and the conduits therefrom are rigidly attached to each other and to support member 42 by connecting structure 142.

Piston 134 is fitted with appropriate seal rings 143 for engaging the walls 144 of cylinder chamber 132. A lower chamber 132a formed within cylinder chamber 132 below piston 134 communicates with a fluid channel 150. Channel 150 is formed into bifurcated channels 152 and 154 at a point remote from the inlet of channel 150 within cylinder chamber 132a. An inlet check valve 158 and a filter 160 is fitted in channel 152 and an outlet check valve 162 and a closely placed air pressure accumulator or air ram 164 is fitted within passageway 154. The outlet water conduit 154 is at some point in its line provided with a pressure relief valve 168.

This pumping structure is so designed that the lower surface of piston 34 when at the highest portion of its stroke within cylinder chamber 132 is not more than 30 feet above mean ocean level.

A critical element in the present invention is the relationship between the various linkages and lever arms, the structure of the force pump and the size of the buoys and overall weight and friction resistance within the system. As discussed in the Summary of the Invention, the upward force acting on a submerged body is equal to the weight of the water displaced by the body. Therefore, the larger water displacement, the larger the force applied to the buoyant object. However, in order for the buoyant object to rise or ascend with an ascending wave, it must be at least slightly afloat or at least sufficiently buoyant so as not to merely sink relative to the upward movement of an ascending wave. Therefore, it is a significant aspect of the present invention that the resistance or force required to activate force pump 130 is properly calculated to be sufficient to require the almost total submersion of buoys 100, yet not so great as to prevent the partial floatation of buoys 100 so that they rise with ascending waves encountered by the buoys. Thus, the force of the ascending wave is more efficiently harnessed by a balanced design between the force required to activate the lift pump or force pump and the force which will be exerted on buoys 100 when in the submerged though "floating" mode.

With this understanding as to the proper relationship between the volumetric displacement of buoys 100, and the corresponding lifting force which will be exerted thereagainst by the effect of the water thereon, and the force required to actuate the force pump, the operation of the present invention will be disclosed. As water descends to the trough of a wave, the weight of buoys 100 and the super structure supporting them causes the downward movement and corresponding rotation of lever 60 to lift piston 134 within cylinder chamber 132. Water is correspondingly drawn in through one way check valve 158 and through filter 160 into lower cylinder chamber 132a. The upward movement of piston 134 creates a negative pressure in chamber 132 and which results in a corresponding filling of the chamber with water. Because of the atmospheric pressure, water will fill chamber 132 up to a 30 foot above sea level height. Thus, the system is designed such that piston 134 may rise to 30 feet above sea level.

As an ascending wave engages buoys 100, buoys 100 initially sink within the water medium as a result of the resistance applied by force pump 130. However, the resistance of force pump 130, as measured by the quantity and height of water being pumped, the friction in the system and mechanical advantage of the linkage involved, is appropriately proportioned to the force applied to buoys 100 when almost totally submerged such that this upward force (substantially equal to the weight of water displaced by the buoys) is delivered to force pump 130 to lower piston 134 within cylinder chamber 132. Correspondingly, water is forced through chambers 150 and 154 and through check valve 162 which permits the flow of water in only one direction out of the system. Relief valve 168 is set to open at any pressure above that which would otherwise damage the structure of the present system.

The piston 134 is placed at the top of the pump and is provided with a slight concavity, this concavity being provided with a very low pressure low capacity pressure relief valve at its highest point. This valve is to provide leakage of a small amount of water with every downward stroke to the top of the piston so that a satisfactory water "primer" seal of the piston rings is always present. This same passageway provides for the forceful escape of any air which might enter the system so that the vacuum necessary for the "lift" pump action is maintained. The pressure relief valve is utilized instead of a check valve so that an air-tight seal can be maintained on the top of the piston. The piston is so designed that this constant small flow of water keeps the upper dashpot filled with water.

The buoy system may be elevated to correspond to the variation of mean sea level by loading hydraulic fluid through passageway 48 into cavity 44. As fluid is loaded within cavity 44, structure 42 and the buoy structure attached thereto are elevated such that fulcrum point of lever 60 is approximately at mean sea level. The buoy system may also be lowered completely below the water surface during storm conditions or when not in operation. The lever 60 and buoy support structure 64 are also provided with a system permitting the vertical extension and retraction of buoy 100 by loading hydraulic fluid through passageway 74 into chamber 72. Through this arrangement, buoy support structure 64 may be extended or retracted in accordance with the wave height and force at any particular period, such that the movement of the buoy 100 sufficiently drives cylinder 134 to pump the greatest amount of water through the system.

The connection of buoy support structure 80 to lever arm 60 through the telescoping arrangement also permits the horizontal rotation of buoy support structure 80 and the attached buoys to accommodate the uneven wave action experienced along the various buoys 100. Moreover, the buoys are formed with relatively pointed leading edges to permit there easy passage through waves when they are temporarily submerged below a wave. The buoys are also free to rotate about legs 82 and 88 on which they are supported. The buoys are also symmetrical about a plane through their chord such that they may be rotated upside down with no effect on the pumping system.

As can be seen in FIG. 1, one embodiment of the invention invisions the use of multiple free rotating buoys positioned on each side of leg 84. This arrangement permits more effective use of varying wave heights acting on these buoys simultaneously.

In a preferred embodiment of the invention, the pumping units are positioned along the contintental shelf where the water depth is sufficient to prevent the deterioration of swell waves from "bottom drag". Because the desired swell waves travel for great distances from their storm sources, an optimum location for the present system is areas which provide a wide horizontal sweep of the ocean removed from land areas by many miles.

The teachings of the present invention become clear with an analysis of the kinetic energy and volume output which a single reasonably sized unit can produce. Several factors are relevant to making these calculations.

The density of ocean water is 1.026. The pressure of fresh water is 0.4335 lbs/in² at one foot depth. The pressure of ocean water is then calculated as being 0.4448 lbs/in² at one foot. The pressure is directly proportional to the depth in feet. Atmospheric pressure at sea level is 14.70 lb/in².

In one embodiment, the present invention provides a system for storing the energy from waves as potential energy by pumping water into lakes at an elevation of 200 feet above sea level. Such a pressure is 200×0.4335 lbs/in²=86.70 lb/in². Since the atmospheric pressure lift of 30 feet utilized by the lift pump can be subtracted from this figure (14.70 lbs/in²) this reduces the necessary pressure to 72 lb/in². This is the pressure necessary for the force pump to apply to the ocean water.

Presuming that the optimal height of the waves likely to be present are 20 feet high and occur at 10 second intervals (6 per minute) the surface area of the piston and its stroke can be calculated. Dimensions to be illustrated are within present technology and are mostly limited by shape, size, and horizontal length of swell waves. To illustrate:

(1) If the buoys are designed having a length of 600 feet, a width of 50 feet, and a height of 10 feet, their bottom surface area will be 30,000 feet or of 4,320,000 square inches. If their gross weight is 1 million pounds the depth of their draft can be calculated. The pressure of ocean water is 0.4448 lbs/in² per foot of depth, or 0.03707 lbs/in² per inch of depth. The weight per square inch of the buoys is 0.2315 lbs per inch of area. The weight per square inch divided by 0.03707 lbs/in² indicates that the buoys would have a free floating draft or 6.24" (0.5 foot draft for these purposes).

(2) If we estimate that the friction force necessary to operate the pumping unit is another million pounds, the buoys will have a total draft of 1.0 feet to overcome both their weight and friction.

(3) If we assume that the inertia of the entire system (reduced some by the air accumulators being placed adjacent the outlet check valve) can be overcome before the crest of the wave is reached by these climbing buoys, we can ignore the inertia and have left a 9 foot height of the buoys still available for net pumping force. it is important to note that 0.5 foot of draft occurs in the trough of the wave just to support the weight. The next 0.5 foot of draft occurs in the upward lift to overcome friction. This indicates that 0.5 foot of the height of the wave is the amount of the wave height lost to friction, the amount lost to weight is constant at both the trough and the crest of the wave.

(4) We can then calculate the net pumping force obtainable from the remaining 9 feet of floating height of the buoys (4,320,000 square inches of bottom surface) as follows: 0.4448 lbs/in² per foot of ocean water depth×9 feet of dept×4,320,000 square inches=17,300,000 pounds of force with the tops of the buoys submerged to sea level. To be submerged to this depth they have used 9.5 feet of the height of the wave. With the wave height being 20 feet, the buoys will have an upward travel of 11.5 feet with 17,300,000 pounds of force. Thus 199,999,000 ft. lbs of energy is produced in the 10 second cycle of one wave×6 times a minute divided by 60 second per minute=19,900,000 ft. lbs/sec. divided by 550 fts lbs/sec.=36,180 h.p. net pumping kinetic energy. 36,180 hp×9.746 kw/hp=26,990 k.w. of power developed at ocean level delivered by levers to a pump 30 feet above sea level.

(5) The desired pump travel using equal length levers will be the distance traveled by the buoys from the trough to the crest of the wave (11.5 feet).

(6) The surface area of the pump can be calculated as follows: 17,300,000 pounds of force divided by desired pressure of 72 lbs/in²=240,300 square inches.

(7) The diameter of the piston is calculated as follows: 240,300 divided by 3.1416=76,490 ($r^2$). The square root of 76.490=277" radius, the diameter being 554" or 46.16 feet.

(8) The volume output with 20 foot waves at 6 times a minute delivered to the 200 foot surface of a lake with the force pump at an elevation of 30 feet will be:
(a) Stroke is 11.5 feet×23.08 ft²=11.5 ft×532.7 square feet=266.6 ft³ per stroke,
(b) Volume delivered per minute=266.6 ft³ per stroke×6 strokes per minute=1600 cubic feet per minute,
(c) Volume deliver per day=1600 ft³/min×1440 minutes/day=2,304,000 cubic feet per day or divided by 43,560 sq.ft./acre=52.89 acre feet per day storage of potential energy at 200 feet elevation from a single pumping unit.

To further illustrate the advantages of the variable height lever fulcrum, the volume and the height of water which a comparatively quiet sea can pump using the present invention may be calculated. Such a comparatively quite sea could have waves of 2.5 feet height at 8 second intervals (7.5 times a minute frequency). The height of the fulcrum of the levers is elevated so that at the trough of the waves the surface of the water in the lift pump remains at a 30 foot altitude, thus permitting the continuing 30 feet of free elevation attributable to the atmospheric pressure. Disregarding the minimal loss of the tangential force of an angle slightly less than 90 degrees we can thus calculate the maximal height of a second lake to which the water on shore might be diverted as a source of potential energy when the waves are of such a slight height. It is again noted that if the upward force of the buoys is not greater than the force required to move the force pump piston that they will not rise with the ascending waves and that if these buoys do not rise no energy is obtained from the waves. The maximal elevation of the surface of this second lower elevation lake the filling of which from the bottom of the lake can be obtained from 2.5 foot waves at 7.5 times a minute is calculated as follows:

(1) Again the first 0.5 foot of the buoys is submerged at rest from their weight. The next 0.5 foot of submergence still remains to overcome the resistance of the unit. This leaves the next 2.0 feet of the buoys to become submerged to fully utilize the maximal displacement of the 2.5 waves—but the height of the waves is no greater than this and hence no pumping action is obtained. We therefore decide to use a one foot of additional submersion so that a one foot rise in the buoys occurs with the 2.5 foot waves, that is after 0.5 foot for friction and 1.0 foot more for net force that the waves can lift the buoys a net 1 foot at 7.5 times a minute. When the waves lift against a force of 1.0 foot of submersion this force is calculated as follows: 4,320,000 square inches of bottom of buoy surface at one foot depth=4,320,000×0.4448 lbs/in² at one foot of ocean water=1,922,000 pounds of force against the piston, the piston moving 1 foot in stroke length. This force divided by the piston surface in square inches (240,300)=8.0 lbs /in² at an altidude of 30 feet.

(2) Thus the maximal altitude which this pressure will cause a lake to rise is 30 feet plus (8.0 lbs/in² per foot of fresh water=18.45 feet=48.45 feet above sea level with a volume of 46.16 feet per stroke.

It is envisioned that the present system may be used to pump water to elevated reservoir areas with the potential energy of such water to be later used to do useful work such as to drive hydro-electric generators. Alternatively, the water pumped by the present invention may be applied directly to do useful work through the use of appropriate water turbines or the like.

Although a preferred embodiment of the invention has been described in the foregoing detailed description and illustrated in the accompanying drawings, it will be understood that the invention is not limited to the embodiment disclosed, but is capable of numerous rearrangements, modifications and substitutions of parts and elements without departing from the spirit of the invention. The present invention is therefore intended to encompass such rearrangments, modifications and substitutions of parts and elements as fall within the scope of the appended claims.

What is claimed is:

1. An apparatus for converting the motion of waves in a body of water to a usable form, comprising:
    a primary support structure having a longitudinal axis therethrough with the lower end secured in the body of water and the opposite upper end rotatable about the longitudinal axis and translatable along the longitudinal axis on the lower end,
    a lever arm having a longitudinal axis therethrough and pivotally supported from said upper end of said primary support structure,
    a plurality of buoys fixed for rotatable engagement on a shaft, said shaft being pivotally fixed to one end of said lever arm, said buoys being positionable on the body of water and buoyant in the water,
    a buoy support structure for attaching the shaft of said buoys to one end of said lever arm, said buoy support structure permitting the rotation of said buoy shaft about an axis parallel to the longitudinal axis of said lever arm such that said buoys may adjust to the irregularity of the motion of the body of water, and
    a force pump attached to the upper end of said primary support structure and driven by the end of said lever arm opposite the attachment of said lever arm to said buoys such that said pump is driven as said buoys are moved in response to the movement of the body of water to pivot said lever arm, said primary support structure pivotally supporting said lever arm at a point therealong such that said buoys are almost totally submerged by ascending waves before a sufficient buoyancy force is achieved to pivot said lever arm on said support structure and actuate said pump.

* * * * *